US012730929B2

(12) United States Patent
Moran et al.

(10) Patent No.: US 12,730,929 B2
(45) Date of Patent: Sep. 8, 2026

(54) DETECTION AND NOTIFICATION OF SENSITIVE INFORMATION ON A MOBILE KEYBOARD

(71) Applicant: Advoteck LLC, Kansas City, MO (US)

(72) Inventors: Daniel P. Moran, Kansas City, MO (US); Bryce A. Wolff, Kansas City, MO (US); Phillip D. Reynolds, Lees Summit, MO (US)

(73) Assignee: Advoteck LLC, Kansas City, MO (US)

( * ) Notice: Subject to any disclaimer, the term of this patent is extended or adjusted under 35 U.S.C. 154(b) by 0 days.

(21) Appl. No.: 18/670,797

(22) Filed: May 22, 2024

(65) Prior Publication Data

US 2025/0363240 A1 Nov. 27, 2025

(51) Int. Cl.
*G06F 21/62* (2013.01)
*G06F 21/60* (2013.01)

(52) U.S. Cl.
CPC ........ *G06F 21/6245* (2013.01); *G06F 21/604* (2013.01)

(58) Field of Classification Search
CPC .......................... G06F 21/6245; G06F 21/604
See application file for complete search history.

(56) References Cited

U.S. PATENT DOCUMENTS 8,838,719 B1 * 9/2014 Faulk .................... H04L 51/212 709/204
9,002,700 B2 4/2015 Hoover et al.
9,374,374 B2 * 6/2016 Steinberg ............ H04L 63/0245
9,686,217 B2 6/2017 Prabhu
10,250,538 B2 4/2019 Prabhu
10,579,814 B2 * 3/2020 Ben-Yair ............... H04L 63/104
11,706,176 B2 7/2023 Prabhu
2013/0239220 A1 9/2013 Gjonej et al.
2018/0075254 A1 3/2018 Reid et al.
2022/0245283 A1 * 8/2022 Springer ............... H04W 12/02
2022/0417194 A1 12/2022 Prabhu

* cited by examiner

*Primary Examiner* — Pramila Parthasarathy
(74) *Attorney, Agent, or Firm* — AVEK IP, LLC

(57) ABSTRACT

This disclosure provides methods, components, devices, and systems for identifying and notifying users when sensitive information is typed on a wireless communication device. Some aspects, more specifically, relate to a keyboard extension installed on a wireless communication device that can monitor communications typed on the keyboard and identify if the typed communications contain sensitive information. In some aspects, the keyboard displays an alert when sensitive information is detected in the communications and may also transmit a notice to a linked account that includes information associated with the detection of the sensitive information.

16 Claims, 8 Drawing Sheets

DETECTION AND NOTIFICATION OF SENSITIVE INFORMATION ON A MOBILE KEYBOARD

BACKGROUND

This disclosure relates generally to wireless message communications, and more specifically, to detecting and notifying users when sensitive information is typed on a wireless communication device, such as a smartphone.

Sensitive information encompasses data that, if disclosed, could be used to identify, locate, or contact an individual or to access their financial resources. This can include any data such as a person's full name, personal identification numbers (e.g., Social Security numbers, passport numbers, driver's license numbers, etc.), address information, contact information, credit card information, and bank account numbers. The protection and secure handling of sensitive information are crucial due to its potential use in identity theft, fraud, and other malicious activities.

Malicious activities designed to obtain sensitive information can typically involve deceptive practices that aim to trick individuals into providing their sensitive information. These activities can take various forms, including phishing, spear phishing, SMS phishing, pretexting, scareware, baiting, and Wi-Fi eavesdropping. Phishing, for instance, is a type of social engineering where attackers send e-mails or messages that appear to be from a legitimate source, such as a bank, a credit card company, or a well-known organization. The messages often urge recipients to provide their sensitive information in order to address a nonexistent, falsely-urgent problem.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for detecting and notifying users when sensitive information is typed on a wireless communication device. The method includes generating a user interface (UI) displaying a keyboard and an input field associated with communications on the wireless communication device and receiving, via the UI, input identifying a selected character from the keyboard. The method also includes detecting sensitive information in a character string within the input field. The character string may include the selected character and characters displayed in the input field. The method further includes causing the UI to display an alert associated with the detection of the sensitive information in the character string.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The systems, methods, and devices of this disclosure each have several innovative aspects, no single one of which is solely responsible for the desirable attributes disclosed herein.

Figure 1:
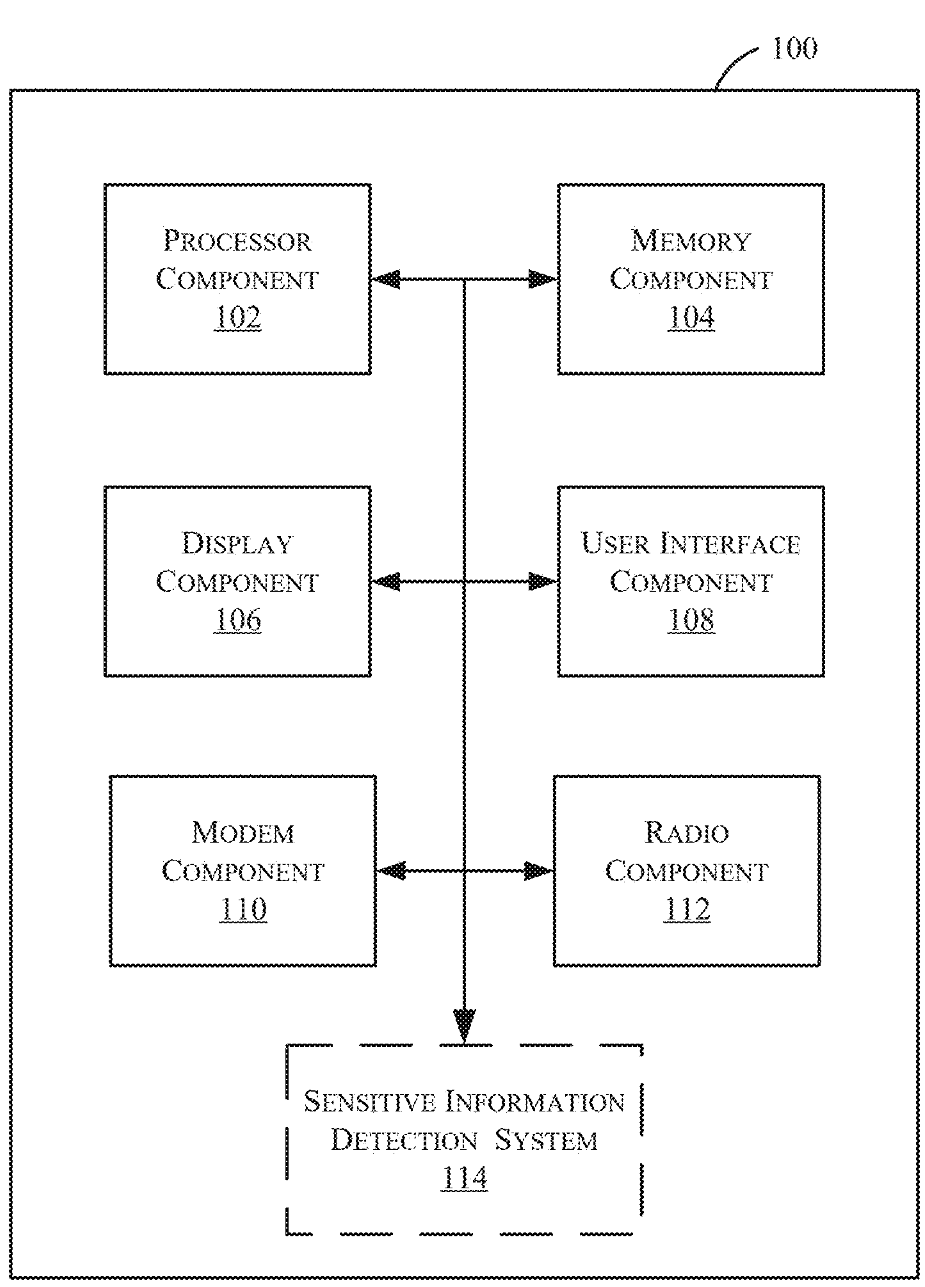
FIG. 1 shows a block diagram of an example wireless communication device that supports processes and functionalities of a sensitive information detection system.

While the present disclosure is amenable to various modifications and alternative forms, specifics thereof, have been shown by way of example in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

This disclosure relates generally to wireless message communications, and more specifically, to identifying and notifying users when sensitive information is typed on a wireless communication device, such as a smartphone. The following description is directed to some particular examples for the purpose of describing innovative aspects of this disclosure. However, a person having ordinary skill in the art will readily recognize that the teachings herein can be applied in a multitude of different ways.

Overview

Sensitive information can refer to data or information that should be protected due to its confidential nature, and its exposure could result in harm, such as identity theft, financial loss, or other significant consequences. Examples of sensitive information include, but are not limited to, personal identifiable information, financial information, health information, login credentials, personal addresses and contact information, and confidential business information.

If a malicious actor obtains sensitive information, it can be used in several harmful ways, including identity theft, financial fraud, healthcare fraud, blackmail and extortion, or corporate espionage. Identity theft, for example, typically involves malicious actors using personal information like Social Security numbers or credit card details associated with individuals and using that information to impersonate the individuals to open new accounts, make purchases, or obtain services illegally.

Phishing scams, as well as other methods, are used to obtain sensitive information such as usernames, passwords, credit card details, and other personal data by pretending to be a trustworthy entity. These scams use various methods of communication to deceive their victims, such as by e-mail, text message, or direct message through social media or third-party messaging services. For instance, e-mail phishing involves scammers sending e-mails that appear to come from legitimate sources, such as banks, credit card companies, or popular websites. These e-mails often urge recipients to click on a link that leads to a fake website designed to mimic the real one, where victims are prompted to enter their personal information. Similarly, text message phishing involves sending fraudulent text messages that claim to be from reputable or known sources. The message might ask the recipient to provide personal information or click on a malicious link, often under the guise of an urgent or enticing message.

Vulnerable populations can refer to groups of individuals who are at increased risk of harm due to specific characteristics or circumstances. These characteristics may include age, disability, socioeconomic status, lack of technology literacy, or other factors that can affect their ability to protect themselves from threats such as phishing scams. For instance, older adults may not be as familiar with digital technologies, which can make it difficult for them to identify phishing attempts. They might also be more trusting of communications that appear to be from legitimate sources. In another example, people with certain disabilities, especially cognitive impairments or visual impairments, might have challenges in discerning the authenticity of e-mails and websites, making them more susceptible to phishing.

Protective measures can be implemented to protect vulnerable populations, including targeted education, technology tools, support networks, and regular check-ins. Targeted education, for example, can provide education tailored to the needs and capabilities of these groups and can help them recognize and avoid phishing scams. Tools such as anti-phishing tools, spam filters, and security software can also help to automatically filter out many threats before they reach vulnerable individuals.

Limitations on protective measures remain, however, as cyber crimes, such as phishing scams, have increased, and the resulting financial costs to consumers have drastically increased. While current protective measures against threats like phishing can be effective, they suffer from limitations such as evasion techniques. Phishing attackers continuously develop new tactics to evade detection by spam filters and security software. For instance, using images instead of text to convey malicious messages can bypass filters designed to detect specific keywords. Phishing can also often exploit human emotions and trust, which can sometimes override logical thinking and security training. For example, a well-crafted spear-phishing attack can fool even the most vigilant individuals if it aligns closely enough with their expectations or fears.

Various aspects of the disclosure improve existing technologies, as well as others, by providing methods, components, and systems that support the detection and notification of sensitive information typed on a wireless communication device. These aspects can aid in identifying sensitive information before transmission of the sensitive information prior to transmission. Certain aspects and techniques described herein may analyze character strings as they are typed on a keyboard to determine whether the character string contains sensitive information. Various means, such as pattern recognition and stored information, can be used in the detection and identification of sensitive information. Certain aspects can utilize early detection to provide an alert to the user that sensitive information is being typed and can caution the user prior to transmission. In certain aspects, an additional notification can be transmitted to a linked account that can alert a third party that sensitive information communication has occurred.

Particular aspects of the subject matter described in this disclosure can be implemented to realize one or more of the following potential advantages. The present disclosure aims to provide real-time and automated detection and notification solutions for users typing on a wireless communication device by implementing mechanisms that analyze text as it is typed and prior to transmission of a message over a network. By analyzing character strings prior to transmission, embodiments can proactively alert users to implement preemptive measures that can prevent potential phishing attacks. As an example, the detection and notification aspects are implementable on a keyboard extension installed on a wireless communication device. This can result in the keyboard being used by a user of the wireless communication device so that the user receives immediate notice when sensitive information is detected.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G, 5G (New Radio (NR)) or 6G standards promulgated by the 3$^{rd}$ Generation Partnership Project (3GPP), among others.

Example Wireless Communication Device

FIG. 1 shows a block diagram of an example wireless communication device 100 that supports the detection and identification of sensitive information being typed on the device. In some examples, the wireless communication device 100 is configured to perform the processes 500 and 500 with reference to FIGS. 5 and 6, respectively. The wireless communication device 100 may include one or more chips, SoCs, chipsets, packages, components, or devices that individually or collectively constitute or include a processing system. The processing system may interface with other components of the wireless communication device 100 and may generally process information (such as inputs or signals) received from such other components and output information (such as outputs or signals) to such other components. In some aspects, an example chip may include a processing system, a first interface to output or transmit information, and a second interface to receive or obtain information. For example, the first interface may refer to an interface between the processing system of the chip and a transmission component, such that the wireless communication device 100 may transmit the information output from the chip. In such an example, the second interface may refer to an interface between the processing system of the chip and a reception component, such that the device 100 may receive information that is passed to the processing system. In some such examples, the first interface may also obtain information from the transmission component, and the second interface may also output information from the reception component.

The processing system includes processor (or "processing") circuitry in the form of one or multiple processors, microprocessors, processing units (such as central processing units (CPUs), graphics processing units (GPUs), neural processing units (NPUs) (also referred to as neural network processors or deep learning processors (DLPs)), or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled with one or more of the processors and may individually or collectively store processor-executable code that, when executed by one or more of the processors, may configure one or more of the processors to perform various functions or operations described herein. Additionally, or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G or 6G compliant) modem). In some implementations, one or more processors of the processing system include or implement one or more of the modems. The processing system may further include or be coupled with multiple radios (collectively "the radio"), multiple RF chains or multiple transceivers, each of which may, in turn, be coupled with one or more of multiple antennas. In some implementations, one or more processors of the processing system include or implement one or more of the radios, RF chains or transceivers.

In some examples, the wireless communication device 100 can be configurable or configured for use in a STA, such as the STA 704 described with reference to FIG. 7. In some other examples, the wireless communication device 100 can be a STA that includes such a processing system and other components, including multiple antennas. The wireless communication device 100 is capable of transmitting and receiving wireless communications in the form of, for example, wireless packets. For example, the wireless communication device 100 can be configurable or configured to transmit and receive packets in the form of physical layer PPDUs and MPDUs conforming to one or more of the IEEE 802.11 family of wireless communication protocol standards. In some other examples, the wireless communication device 100 can be configurable or configured to transmit and receive signals and communications conforming to one or more 3GPP specifications including those for 5G NR or 6G. In some examples, the wireless communication device 100 also includes or can be coupled with one or more application processors which may be further coupled with one or more other memories. In some examples, the wireless communication device 100 further includes a user interface (UI) (such as a touchscreen or keypad) and a display, which may be integrated with the UI to form a touchscreen display that is coupled with the processing system. In some examples, the wireless communication device 100 may further include one or more sensors, such as, for example, one or more inertial sensors, accelerometers, temperature sensors, pressure sensors, or altitude sensors, that are coupled with the processing system.

The wireless communication device 100 includes a processor component 102, a memory component 104, a display component 106, a user interface component 108, a modem component 110, and a radio component 112, which can support the installation and operation of the sensitive information detection system 200 on the wireless communication device 100. Portions of one or more of the components 106, 108, 110, and 112 may be implemented at least in part in hardware or firmware. In some examples, at least some of the components 106, 108, 110, and 112 of the device 100 are implemented at least in part by a processor and as software stored in a memory. For example, portions of one or more of the display component 106, the user interface component 108, and the modem component 110 can be implemented as non-transitory instructions (or "code") executable by the processor 102 to perform the functions or operations of the respective module.

In some implementations, the processor 102 may be a component of a processing system. A processing system may generally refer to a system or series of machines or components that receives inputs and processes the inputs to produce a set of outputs (which may be passed to other systems or components of, for example, the device 100). For example, a processing system of the device 100 may refer to a system including the various other components or subcomponents of the device 100, such as the processor, a transceiver, a communications manager, or other components or combinations of components of the device 100. The processing system of the device 100 may interface with other components of the device 100 and may process information received from other components (such as inputs or signals) or output information to other components. For example, a chip or modem of the device 100 may include a processing system, a first interface to output information, and a second interface to obtain information. In some implementations, the first interface may refer to an interface between the processing system of the chip or modem and a transmitter, such that the device 100 may transmit information output from the chip or modem. In some implementations, the second interface may refer to an interface between the processing system of the chip or modem and a receiver, such that the device 100 may obtain information or signal inputs, and the information may be passed to the processing system. A person having ordinary skill in the art will readily recognize that the first interface also may obtain information or signal inputs, and the second interface also may output information or signal outputs.

The processor 102 is capable of, configured to, or operable to process information received through the radio 112 and the modem 110, and processes information to be output through the modem 110 and the radio 112 for transmission through the wireless medium. The information can include information processed by the sensitive information detection system 200. The processor 102 may perform logical and arithmetic operations using program instructions stored within the memory 104. The instructions in the memory 104 may be executable (by the processor 102, for example) to implement the methods described herein. In some examples, the processor 102, together with the memory 104, is capable of or configured to facilitate processes performed by the sensitive information detection system 200, including generating a user interface (UI) displaying a keyboard and an input field associated with communications on the wireless communication device, receiving, via the UI, input identifying a selected character from the keyboard, detecting sensitive information in a character string within the input field, wherein the character string includes the selected character and characters displayed in the input field, and causing the UI to display an alert associated with the detection of the sensitive information in the character string.

The memory 104 is capable of, configured to, or operable to store and communicate instructions and data to and from the processor 102.

The user interface 108 may be any device that allows a user to interact with the wireless communication device 100, such as a keyboard, a mouse, a microphone, et cetera. In aspects, the user interface 108 may be integrated with the display component 106 to present a touchscreen.

The modem 110 is capable of, configured to, or operable to modulate packets and to output the modulated packets to the radio 112 for transmission over the wireless medium. The modem 110 is similarly configured to obtain modulated packets received by the radio 112 and to demodulate the packets to provide demodulated packets.

The radio 112 includes at least one radio frequency transmitter and at least one radio frequency receiver, which may be combined into one or more transceivers. The transmitter(s) and receiver(s) may be coupled to one or more antennas. In some aspects, the processor 102, the memory 104, the modem 110, and the radio 112 may collectively facilitate the wireless communication of the wireless communication device 100 with other wireless communication devices over multiple frequency bands (such as 2.4 GHz, 5 GHz, or 6 GHz).

Example Sensitive Information Detection System

Figure 2:
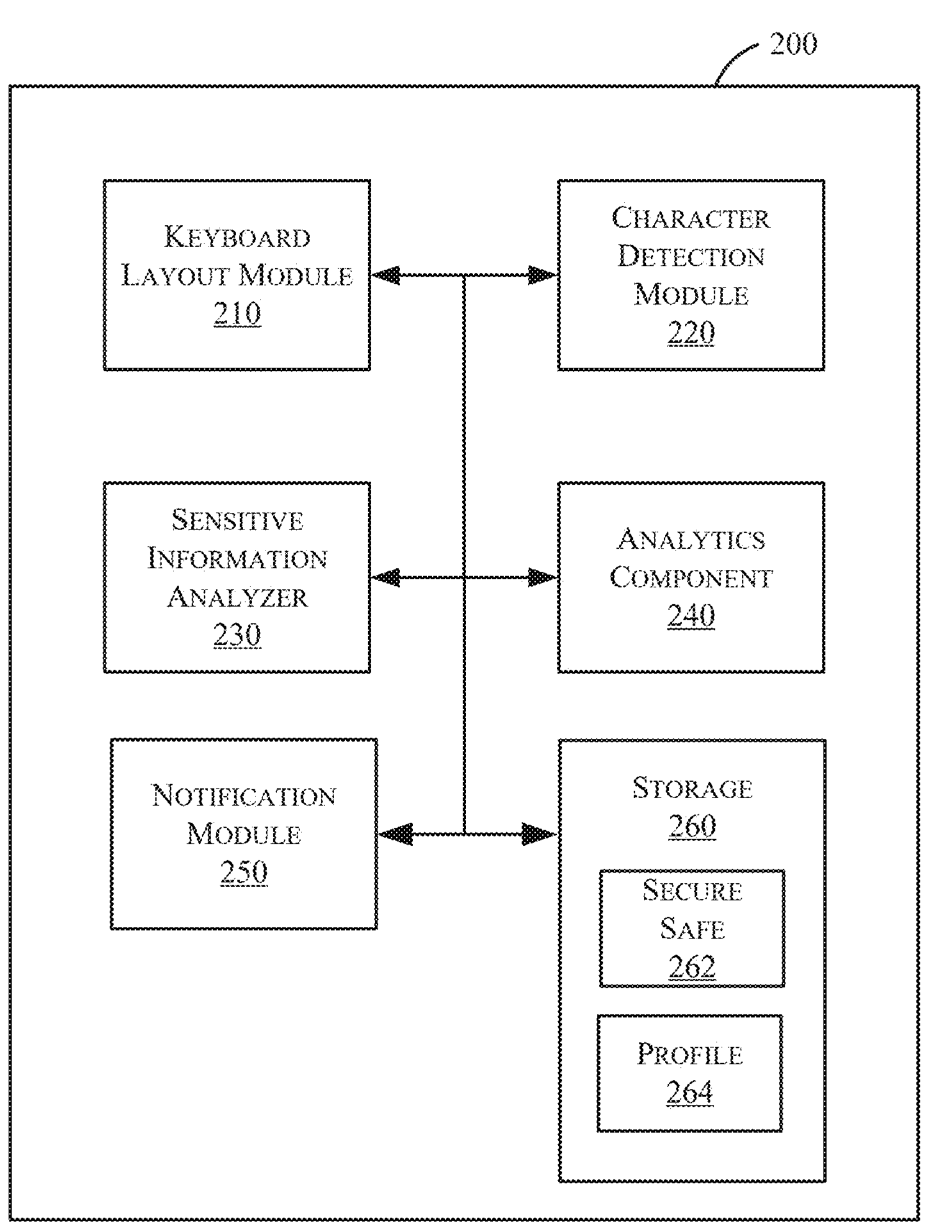
FIG. 2 shows a block diagram of an example sensitive information detection system that supports the detection and notification of sensitive information typed on a wireless communication device.

Referring now to FIG. 2, a block diagram of an example sensitive information detection system 200 suitable for use in implementing embodiments of the disclosure is shown. The sensitive information detection system 200 is configured to detect sensitive information on a wireless communication device as it is being typed and to provide notification and corrective actions when detection occurs. The sensitive information detection system 200 can utilize pattern detection algorithms to continuously monitor communications and then alert a user when a pattern matching a type of sensitive information is detected. Once detected, the sensitive information detection system 200 can generate a corresponding notice to the individual typing the sensitive information and may also provide an additional notice to a linked account. Additionally, the sensitive information detection system 200 may provide mechanisms that can redact the sensitive information prior to transmission to either the recipient of the message or the linked account.

The sensitive information detection system 200 can be implemented as a standalone application or as part of another application or suite of applications. For example, the sensitive information detection system 200 can be implemented as part of a suite of security tools or cyber security applications, enabling the detection of sensitive information to be a module of the cyber security application.

The sensitive information detection system 200 includes a keyboard layout module 210, a character detection module 220, a sensitive information analyzer 230, an analytics component 240, a notification module 250, and storage 260. The storage includes a security safe mechanism 262 and a user profile module 264.

The keyboard layout module 210 is a component of the sensitive information detection system 200 configured to produce user interfaces having a keyboard, an input field, and a dialog window. The various layouts of the keyboard can accommodate different languages, typing styles, and user preferences. These layouts include, but are not limited to, QWERTY keyboards, QWERTZ and AZERTY keyboards, Dvorak keyboards, Colemak keyboards, Swipe keyboards, split keyboards, one-handed keyboards, and multilingual and non-Latin script keyboards. In addition to the various keyboard layouts, the keyboard layout module 210 is further configured to provide predictive text, auto-correction, and customization options to enhance typing efficiency and comfort.

During operation, when communication is performed on a wireless communication device 100, the keyboard layout module 210 can generate the keyboard, input field, dialog window, and various other components to facilitate message communication between the user of the wireless communication device 100 and another recipient. It should be noted that in some implementations, the interface can be provided by another application and the keyboard functionalities can be provided by the sensitive information detection system 200.

The character detection module 220 is a component of the sensitive information detection system 200, detects characters and text being typed on a wireless communication device 100 via the keyboard layout module 210. The character detection module 220 is further configured to provide input interpretation, predictive text, and auto-correction services. When a user presses a key on the keyboard, the character detection module 220 can determine which key is pressed based on the touch coordinates. After each character press, a corresponding character can be displayed within the input field of the UI. Additionally, each character can be added to a character string that is temporarily stored in the input field prior to transmission to a recipient.

The character detection module 220 is further configured to provide predictive text suggestions based on characters in the character string. The predictive text can predict the word the user is likely to type next based on at least a portion of the characters in the character string as well as contextual clues from the surrounding text. In some embodiments, the character detection module uses a diction database and language models to suggest complete words.

The character detection module 220 is further configured to provide adaptive learning based on the typing behavior of the user. As a user types, the character detection module 220 can continuously collect data on the words and information used most frequently, how those words are combined, and common mistakes a user may make. Based on the collected data, the predictive text generated by the character detection module 220 can adjust its algorithms to better predict the next word as well as more accurate predictions of partially typed words.

In some implementations, the character detection module 220 provides the learned typing behavior of a user to the analytics component 240. Additionally, other information, such as word usage and information, can also be provided to the analytics component 240 for greater analysis.

The sensitive information analyzer 230 is a component of the sensitive information detection system 200 configured to detect sensitive information typed on the keyboard of a wireless communication device 100. In some implementations, the sensitive information analyzer 230 uses pattern recognition algorithms to detect and identify sensitive information within a character string. Pattern recognition algorithms can be used to generate patterns using syntax such as literals, metacharacters, quantifiers, character classes, alternation, anchors, and groupings. For instance, metacharacters can include characters within a pattern with special meaning, such as '•' (dot) matches any single character except newline characters, '\d' matches any digit, equivalent to [0-9], '\w' matches any alphanumeric character plus underscore, equivalent to [a-z A-Z 0-9], and '\ s' matches any whitespace character (spaces, tabs, line breaks).

From this syntax, as well as through other means, a pattern can be compiled that corresponds to a type of sensitive information. For instance, a Social Security number is a nine-digit number that is often broken into three parts separated by a hyphen. Patterns that correspond to nine-digit numbers or patterns that are hyphenated, such as '123-45-6789', can be compiled. In some implementations, the pattern may analyze nine-digit numbers and the groupings to which social security numbers adhere. The three groups include the area number, the group number, and the serial number. The area number is assigned by the geographical region, the group number (the middle two digits) ranges from 01 to 99 but is not assigned in consecutive order, and the serial number is assigned a four-digit number that runs consecutively after each assigned number. Based on the requirements of each grouping, the pattern algorithm can generate a particular pattern that can recognize whether a typed nine-digit number adheres to the requirements.

Once a pattern is compiled, the sensitive information analyzer 230 can attempt to match the pattern against a character string from left to right. Each character can be checked to see if it meets the conditions of the pattern, using the pattern's elements and operators to guide the matching process. The sensitive information analyzer 230 can then return the matches found within the character string.

The sensitive information analyzer 230 is further configured to match stored sensitive information stored in a secure safe 262 in the storage 260. For instance, the secure safe 262 may store a copy of a driver's license number, which the sensitive information analyzer 230 can match against while scanning character strings. In some implementations, the sensitive information analyzer 230 can scan character strings against both the compiled patterns and the stored sensitive information.

In some implementations, the secure safe 262 stores only a portion of the sensitive information, which the sensitive information analyzer 230 can scan for matches. For instance, the secure safe 262 may store a portion of a bank account number such as '*6554', where a portion of the bank account number is redacted and another portion unredacted. This can allow the sensitive information analyzer 230 to match the stored unredacted characters against the characters in a character string. Additionally, the sensitive information analyzer 230 can match the number of characters to see if the match corresponds to the number of characters stored in the secure safe 262. By storing redacted sensitive information, the secure safe 262** does not need to store unredacted sensitive information.

The analytics component 240 is a component of the sensitive information detection system 200 configured to compile analytics associated with user usage of the sensitive information detection system 200. The compiled analytics include, information such as frequency of sensitive notifications generated by the user, frequency of application use by the users' linked account, frequency of application removal, contact information from potential scam messengers, scam plain text patterns transmitted to the user, potential archival of the message that contained the sensitive information that the user shared with the scammer.

The analytics component 240 is further configured to use statistical techniques on the information collected to describe and summarize the data, identifying patterns and trends. In some implementations, the analytics component can analyze the cause of observed patterns and trends, and identify correlations and potential causal relationships. For instance, certain communication patterns between the user and a contact may give rise to potential phishing instances. In some instances, the analytics component 240 uses optimization and simulation algorithms to recommend actions to mitigate potential disclosure of sensitive information.

The analytics component 240 is further configured to display, via a UI, an analytics page designed to help the user and the linked account streamline the process of reporting cybercrime to their financial institutions or the proper law enforcement authorities. The analytics component 240 can compile the above data using diagnostic and descriptive analysis methods and then display that information to the linked account. Once the above information from the potential scam or phishing message has been collected and stored, the contact information data and the financial information the potential scam requested are transmitted via the notification sent to the user's linked account and housed further within the analytics page.

The analytics component 240 is further configured to keep track of local and regional scams and threats and offer additional data like the particular time of day the sensitive information is most often requested from the user, to identify patterns in the time of day in which a user is being targeted, or what natural language patterns the user has been most susceptible toward. Further, this information can be stored by the application so that it can be used to file a report with the user's financial institution or local enforcement agency.

The notification module 250 is a component of the sensitive information detection system configured to produce an alert when the sensitive information analyzer 230 detects sensitive information in a character string. The notification module 250, upon detection of the sensitive information, causes the UI to display a notice to the user informing them that sensitive information may have been detected in the character string. In some implementations, the alert may include instructions indicating steps the user can take to prevent dissemination of the sensitive information. For instance, the alert may inform the user that they are about to share sensitive information and that they should redact that information or delete it from the input field. It should be noted that the alert may change based on the type of user, the sensitive information being typed, and the configuration of the sensitive information system 200.

The notification module 150 is further configured to transmit an alert to a linked account associated with the user and their profile stored by the sensitive information detection system 200. The transmitted alert may include information associated with the detection of the alert and may also include a redacted portion of the sensitive information, thereby providing the linked account with notice of the type of sensitive information being shared with another recipient.

In some implementations, the alert transmitted by the notification module 150 to the linked account, also prevents the user from transmitting the message to a recipient until the linked account authorizes the transmission. The alert to the linked account can include notice of the detection, a redacted portion of the sensitive information that was typed, and a request for transmission authorization. Upon receiving the request or denial, the linked account can transmit the response back to the sensitive information detection system 200 and can respond accordingly.

In some implementations, the notification module 150 causes the UI to display an alert that prevents transmission of the character string in the input field from being transmitted to the recipient. For instance, the alert may inform the user that sensitive information is detected and that transmission of the message is prohibited. In some implementations, the notification module 150 causes the UI to display an alert that prevents transmission of the character string in the input field, but the user may override the prevention by acknowledging that they are aware that sensitive information is detected.

The storage 260 is a component of the sensitive information detection system 200 configured to store and manage the input and output of data to and from the sensitive information detection system 200. The storage 260 is further configured to store data information associated with the sensitive information detection system 200, such as the secure safe 262 and the user profiles 264. The storage 260 is further configured to secure the stored data through various means, including encryption, authentication mechanisms, data access controls, and secure storage solutions. Encryption, for instance, can transform the stored data, such as the data stored in the secure safe 262, into a scramble format that can only be read or decoded with a decryption key. The encryption techniques used by the storage 260 include AES (Advanced Encryption Standard) for data encryption and RSA or ECC for encrypting keys.

It is noted that FIG. 2 is intended to depict the major representative components of a sensitive information detection system 200. In some embodiments, however, individual components may have greater or lesser complexity than, as represented in FIG. 2, components other than or in addition to those shown in FIG. 2 may be present, and the number, type, and configuration of such components may vary.

Example Communication Interfaces

Figures 3A, 3B:
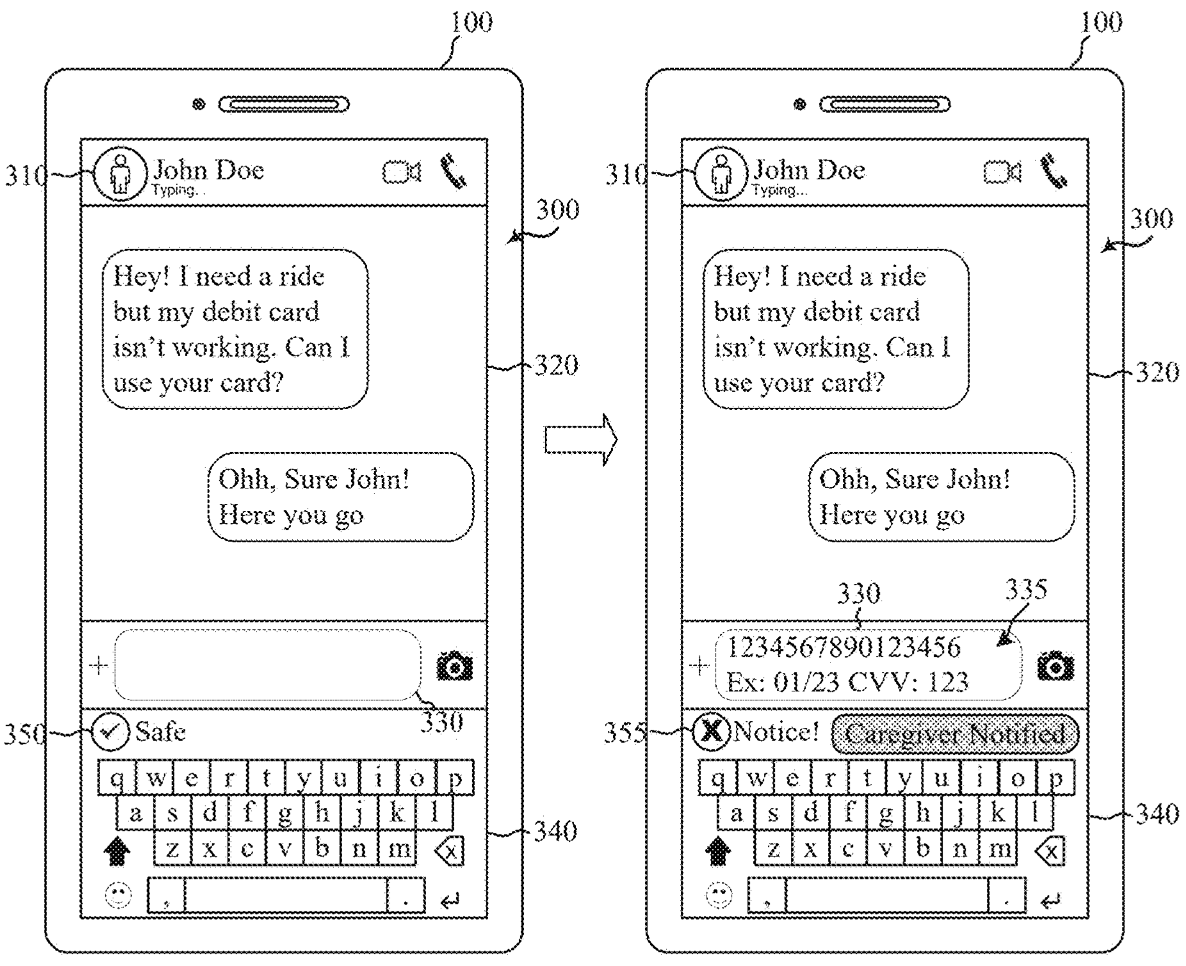
FIGS. 3A-D show example message interfaces displaying communications on a wireless communication device utilizing the sensitive information detection system.

FIGS. 3A-3D illustrate an example communication interface 300 for text-based communication between a user and a recipient 310 while using the sensitive information detection system 200, in accordance with embodiments of the present disclosure. As shown in FIG. 3A, and in this example, the communication interface 300 presents a visualization of a conversation between the user and the recipient 310 in a dialog window 320. Additionally, the communication interface 300 includes an input field 330, a keyboard 340, and a notification 350. The communication interface 300 provides a chronological view of a conversation between the user and the recipient 310.

During the conversation, the sensitive information detection system 200 continuously monitors characters typed into the input field 330 and scans the characters for sensitive information. As shown in FIG. 3A, there has been no detection of sensitive information, and that is reflected by the notification 350, indicating that the conversation up to that point has been safe.

As shown in FIG. 3B, the user has typed characters into the input field 330 via the keyboard 340. The character string 335 within the input field 330 is analyzed by the sensitive information detection system 200 using the sensitive information analyzer 230, which detected that the character string 335 contains sensitive information. In this example, the detected sensitive information is credit card information.

As a result of the sensitive information detection system 200 detecting sensitive information in the input field 330, the system 200 causes the communication interface 300 to display an alert notification 355. In this example, the alert notification 355 alerts the user that sensitive information is about to be shared and that a caregiver has been notified. In this example, the caregiver may be another individual associated with the user who has a linked account with the user. The caregiver may have notification privileges tied to the user and their profile.

Figures 3C, 3D:
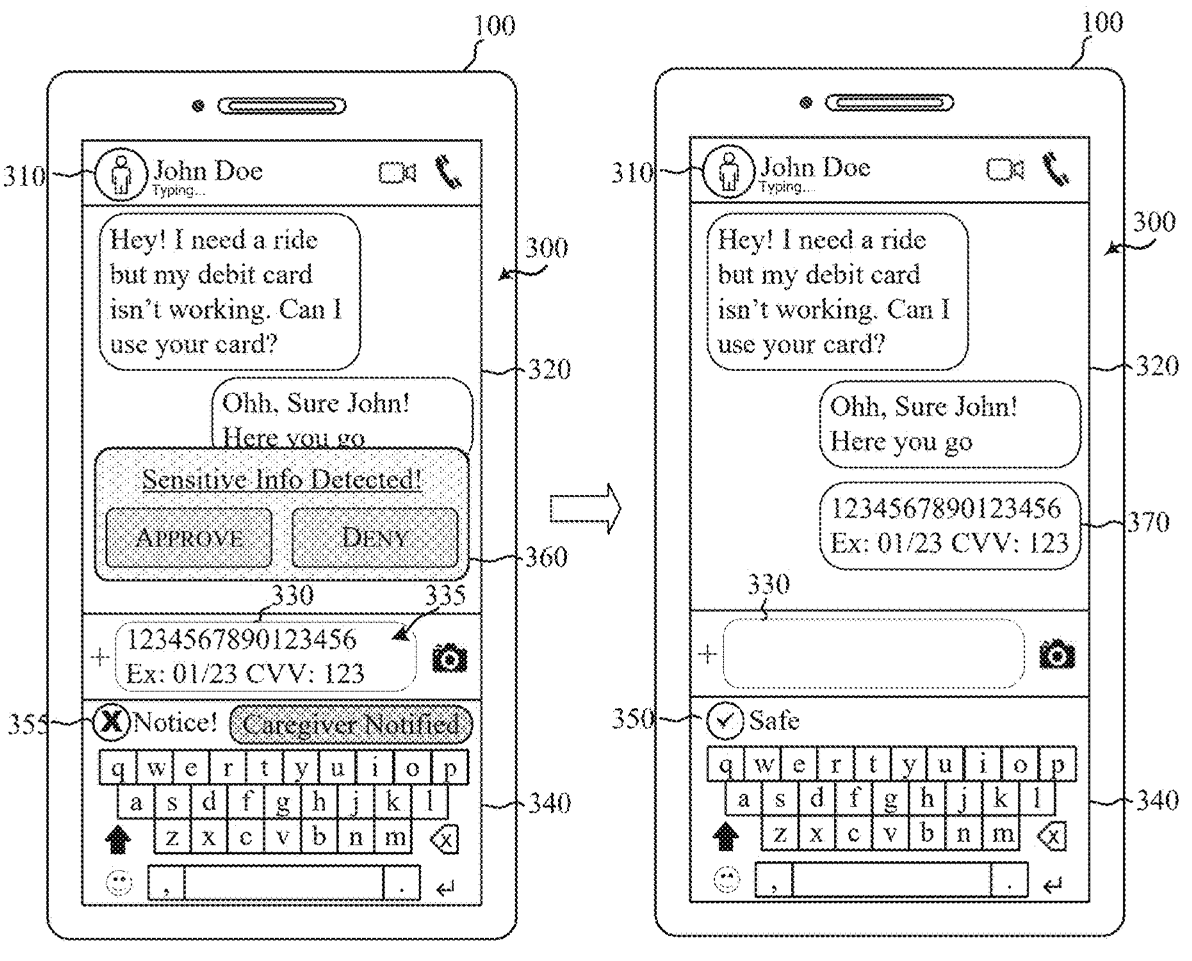

As shown in FIG. 3C, and in this example, the sensitive information detection system 200 causes the communication interface 200 to display an additional notification 360 when sensitive information is detected. In this example, the additional notification 360 prompts the user to approve or deny the transmission of the character string 335 containing the sensitive information to the recipient 310. This provides an additional opportunity for the user to decide whether sending the sensitive information is prudent or not. If the user denies the transmission of the sensitive information, then the sensitive information detection system 200 can prevent the transmission of the sensitive information. In some implementations, when denying the transmission, the sensitive information detection system 200 may delete the sensitive information from the character string. In some other implementations, the sensitive information detection system 200 may redact the sensitive information from the character string.

As shown in FIG. 3D, and in this example, the user has selected to approve the transmission of the sensitive information to the recipient 310. As shown, the communication interface 300 presents a visualization of the conversation between the user and the recipient 310 in the dialog window 320. As now shown, the dialog window 320 includes additional dialog 370 indicating the transmission of the character string that was previously present in the input field 330. That character string 335 includes the sensitive information detected by the sensitive information detection system 200. As now shown, the notification 350 has reappeared as the system 200 is now monitoring for subsequent sensitive information that may be typed into the input field 330.

Example Notification Interfaces

Figures 4A, 4B:
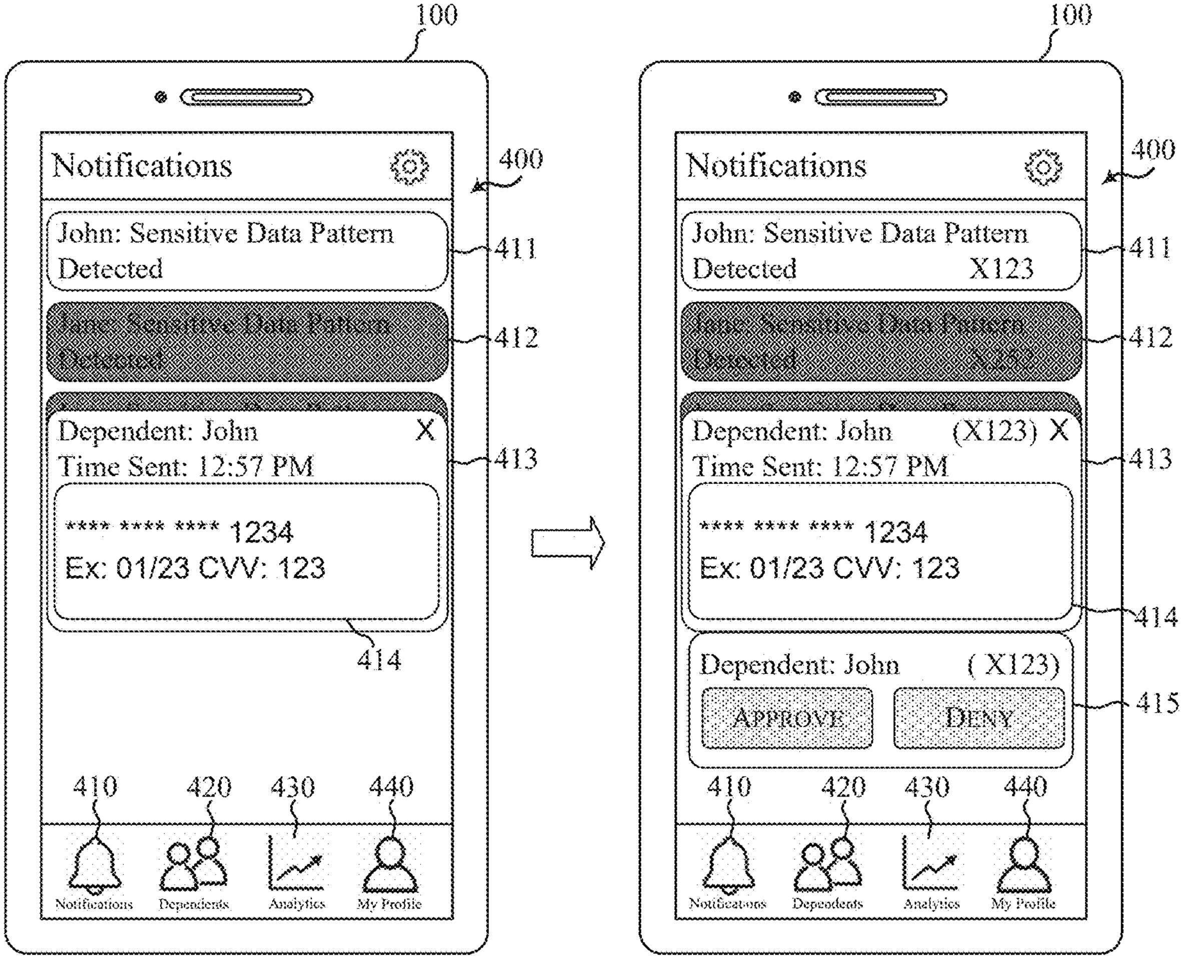
FIGS. 4A-B show example notification interfaces displaying notifications on a wireless communication device utilizing the sensitive information detection system.

FIGS. 4A-4B illustrate an example notification interface 400 for notifications of sensitive information detection of communication by users while using the sensitive information detection system 200, in accordance with embodiments of the present disclosure. As shown in FIG. 4A, and in this example, the notification interface 400 presents a visualization of sensitive information notifications 411 and 412. Additionally, the notification interface 400 includes a pop-out window 413 that has additional details associated with the sensitive information notification 411. In this example, the pop-out window 413 includes details of the user that generated the notification, and in this instance, 'John,' the time the detection occurred, and a redacted notice 414 displaying a redacted portion of the sensitive information that was detected by the sensitive information detection system 200.

As shown, and in some implementations, the notification interface 400 includes additional options, including a notifications menu 410, a dependents list 420, an analytics menu 430, and a profile menu 440. The notifications menu 410, when selected, can cause the UI to display the notifications interface, as shown in FIGS. 4A and 4B.

The dependents list 420, when selected, can cause the UI to display a dependents interface (not shown) that can list users associated with the administrative user. In some implementations, the dependents list 420 can also allow administrators to configure preferences for each of the users, respectively. These preferences can include greater or lesser restrictions on sensitive information notifications and whether or not such a user is authorized to transmit such information. In some implementations, the preferences may indicate that a user may transmit certain sensitive information while being restricted from sending other sensitive information. For instance, a user may be allowed to transmit home addresses or phone numbers but may be restricted from transmitting banking information.

The analytics menu 430, when selected, can cause the UI to display certain analytics associated with the users associated with the administrative account of the sensitive information detection system 200. In some implementations, the users correspond with the users listed in the dependents list. In some implementations, the users may correspond to all users utilizing the sensitive information detection system 200. In this way, administrators may gain additional information that they may be able to use to protect the users from potentially transmitting sensitive information inadvertently.

The profile menu 440, when selected, can cause the UI to display configuration preferences associated with the administrator. These preferences include, but are not limited to, language and input settings, text correction and suggestions, notification preferences, layout preferences, and the like.

As shown in FIG. 4B, and in this example, the sensitive information detection system 200 causes the notification interface 400 to display an additional notification 414 when notifications 411 and 412 are selected. In this example, the additional notification 414 prompts the user to approve or deny the transmission of the sensitive information. This provides an additional opportunity for an administrator to decide whether sending the sensitive information is prudent or not. If the administrator denies the transmission of the sensitive information, then the sensitive information detection system 200 can prevent the transmission of the sensitive information by the user typing the sensitive information. In some implementations, when denying the transmission, the sensitive information detection system 200 may delete the sensitive information from the character string. In some other implementations, the sensitive information detection system 200 may redact the sensitive information from the character string.

In some implementations, the sensitive information detection system 200 includes an administrative component, as shown in FIGS. 4A and 4B, and a user component as shown in FIGS. 3A-3D. Users can create profiles that operate in either mode depending on the configuration in which they choose to operate. While operating in an administrative mode, the sensitive information detection system 200 can link with the profiles operating in the user mode. While in the administrative mode, the sensitive information detection system 200 receives notifications of sensitive information detections detected by linked users. While in the user mode, the sensitive information detection system 200 can transmit notifications to linked accounts of administrators when sensitive information is typed by a user.

It should be noted, that while FIGS. 4A and 4B only show two dependent users, the sensitive information detection system 200 can link any number of user accounts to an administrative account. It should also be noted that the sensitive information detection system 200 does not require a linked administrative account to operate. In some implementations, the sensitive information detection system 200 operates solely on a single device that provides notice only to the user operating such device.

Example Flow Diagrams

Figure 5:
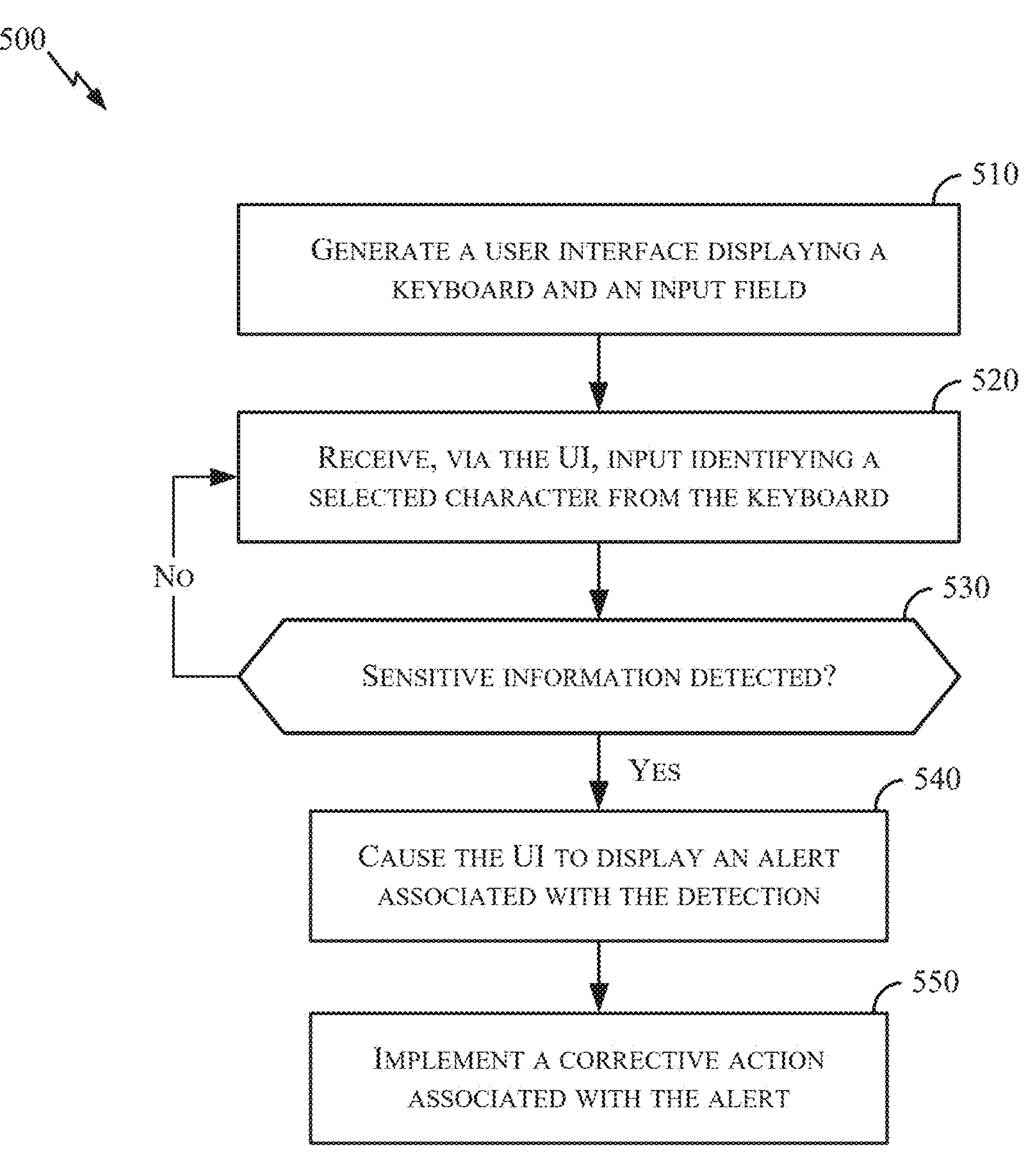
FIG. 5 shows a flowchart illustrating an example process performable by or at a wireless communication device that supports the detection and notification of sensitive information.
Figure 6:
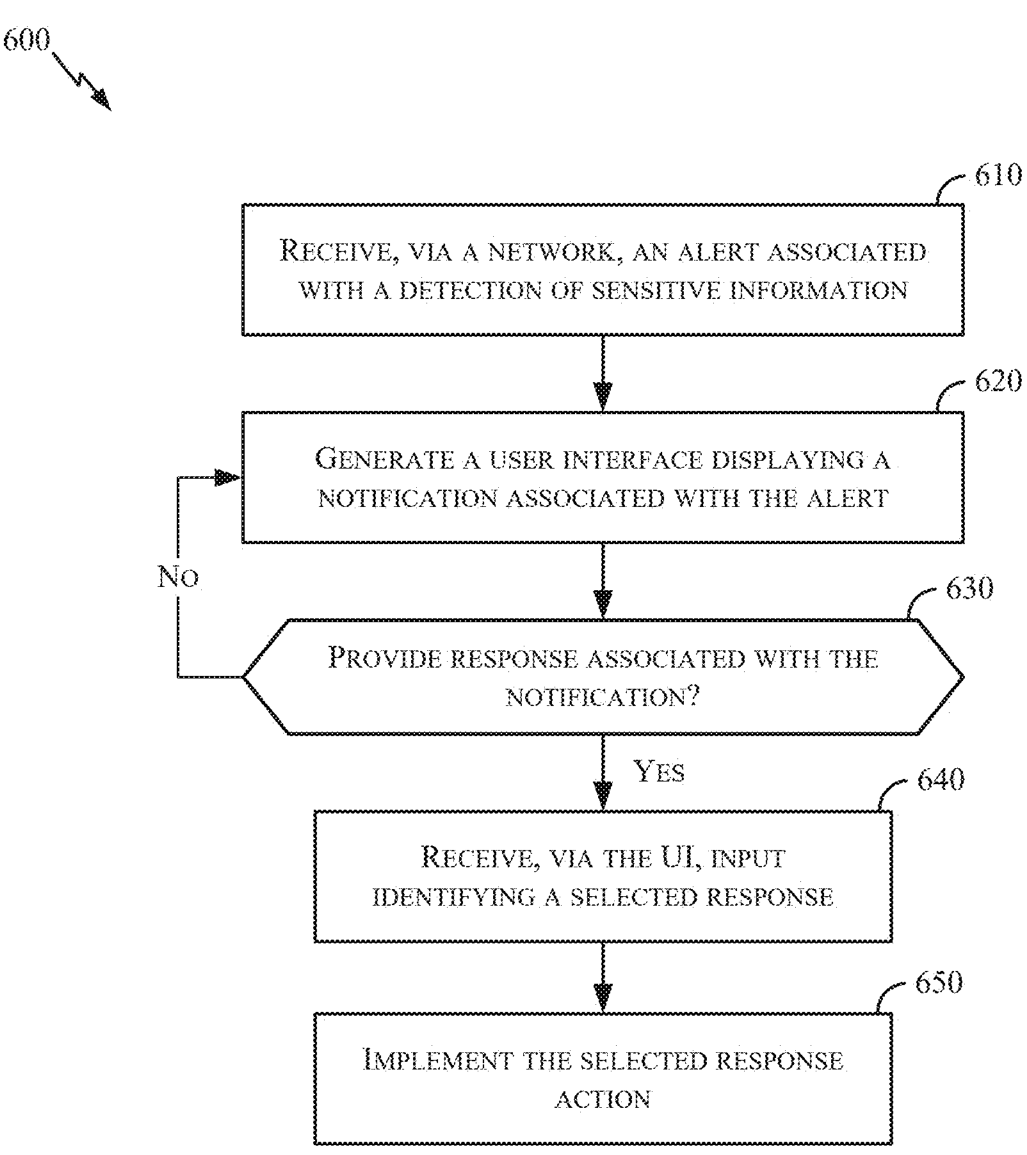
FIG. 6 shows a flowchart illustrating an example process performable by or at a wireless communication device that supports notification and response to detection of sensitive information on a separate device.

FIGS. 1-4, the corresponding text, and the examples provide a number of different systems that enable the detection and notification of sensitive information typed on a wireless communication device prior to transmission. In addition to the foregoing, embodiments can also be described in terms of flowcharts comprising acts and steps to accomplish a particular result. For example, FIGS. 5 and 6 illustrate flowcharts of exemplary methods in accordance with one or more embodiments. The methods described in relation to FIGS. 5 and 6 may be performed with fewer or more steps/acts, or the steps/acts may be performed in differing orders. Additionally, the steps/acts described herein may be repeated or performed in parallel with one another or in parallel with different instances of the same or similar steps/acts.

With reference to FIG. 5, a flow diagram illustrating a method is provided. Each block of the method 500 and any other methods described herein comprise a computing process performed using any combination of hardware, firmware, and/or software. For instance, in some embodiments, various functions are carried out by a processor executing instructions stored in memory. In some cases, the methods are embodied as computer-usable instructions stored on computer storage media. In some implementations, the methods are provided by a standalone application, a service or hosted service (standalone or in combination with another hosted service), or a plug-in to another product, to name a few.

FIG. 5 shows a flowchart illustrating an example process 500 performable by or at a wireless communication device that supports sensitive information detection and notification operations. The operations of the process 500 may be implemented by a STA or its components as described herein. For example, the process 500 may be performed by a wireless communication device, such as the wireless communication device 100 described with reference to FIG. 1, operating as or within a wireless STA. In some examples, the process 500 may be performed by a wireless STA such as one of the STAs 704 described with reference to FIG. 7.

In block 510, the wireless communication device, via the sensitive information detection system 200, generates a user interface (UI) displaying a keyboard and an input field associated with communications on the wireless communication device. In some implementations, the communication can be between a recipient and a user who is actively using the keyboard on the wireless communication device to type. For instance, the communication can take the form of a text message service, a chatroom, a chat messaging service, an e-mail service, and the like.

In block 520, the wireless communication device receives, via the UI, input identifying a selected character from the keyboard. In some implementations, the character is added to a character string displayed on the input field. In block 530, the sensitive information detection system 200, operating within the wireless communication device, determines whether sensitive information is detected in the selected character and characters already displayed in the input field. The collection of the selected character and characters displayed can take the form of a character string, which the sensitive information detection system 200 can analyze to detect sensitive information.

In some implementations, the sensitive information detection system 200 detects sensitive information in the character string by comparing the character string with secure information stored on the wireless communication device. As described, the sensitive information detection system 200 may store sensitive information, a portion of sensitive information, or a portion of redacted sensitive information with which the character string in the input field can be compared. This stored information can be added by the user of the sensitive information detection system 200 upon initiation of the keyboard extension. In this manner, specific sensitive information can automatically trigger the detection of sensitive information.

In some implementations, the sensitive information detection system 200 detects sensitive information in the character string by comparing the character string with patterns defined as secure information. As described, the sensitive information detection system 200 compares a predefined pattern to the character string. In some implementations, the comparison includes more than one predefined pattern corresponding to a sensitive information type, respectively. If the character string corresponds to a predefined pattern, then the sensitive information detection system 200 can identify the character string that matches the pattern to the sensitive information type and can subsequently produce a notification upon the identification.

If no sensitive information is detected, then the wireless communication device and the sensitive information detection system 200 return to block 520 and wait for additional character input. However, if sensitive information is detected, then the process 500 proceeds to block 540.

In block 540, the detection of sensitive information causes the UI to display an alert that notifies the user that sensitive information has been typed. The alert can include a message and graphic that may result in the user giving pause before transmitting their message over a network to a recipient.

In block 550, the sensitive information detection system 200 implements a corrective action associated with the alert. In some implementations, the corrective action includes redacting, prior to transmission, a portion of the character string containing the sensitive information such that the sensitive information is masked from view. The corrective action can also include transmitting a notification to a linked account (e.g., an administrator linked to the user account typing with the sensitive information detection system 200). The notification can include a notice that the sensitive information is typed on the wireless communication device. In some implementations, the notice also includes the redacted portion of the character string containing the sensitive information.

In some implementations, the corrective action prevents transmission of the character string, including the sensitive information in the input field. The transmission can be blocked until authorization is granted by a linked account. The sensitive information detection system 200 can pause transmission until receiving an authorization granting the transmission of the character string. Upon receiving authorization, the sensitive information detection system 200 can transmit the character string in the input field over a network to a recipient.

In some implementations, the sensitive information detection system 200 can analyze transmitted communications displayed in a dialog window. The analysis can detect whether the transmitted communications include a portion of known message content. Detection of known message content can cause the UI to display a second alert associated with that detection within the transmitted communication. For example, known message content can include known phishing word patterns that may be attempting to scam the user and obtain their sensitive information. In some implementations, the second alert can also transmit a notification to a linked account.

In some implementations, the sensitive information detection system 200 can display a dialog window associated with transmitted communications, where the transmitted communications include the contact information of the parties involved. The sensitive information detection system 200 can detect the contact information associated with a blacklist that is unapproved for communications. Upon detection of the blacklisted contact, the sensitive information detection system 200 can cause the UI to display a second alert associated with the blacklisted detection. Similarly, the second alert can cause the system 200 to transmit a notification to a linked account, providing notice of the detection.

In some implementations, the corrective action includes redacting a portion of the character string containing the sensitive information in the input field. Once redacted, the sensitive information detection system 200 can transmit, over a network, the redacted character string to a recipient associated with the communications. The redacted character string can then be displayed in a dialog window on the wireless communication device.

With reference to FIG. 6, a flow diagram illustrating a method is provided. Each block of the process 600 and any other methods described herein comprise a computing process performed using any combination of hardware, firmware, and/or software. For instance, in some embodiments, various functions are carried out by a processor executing instructions stored in memory. In some cases, the methods are embodied as computer-usable instructions stored on computer storage media. In some implementations, the methods are provided by a standalone application, a service or hosted service (standalone or in combination with another hosted service), or a plug-in to another product, to name a few.

FIG. 6 shows a flowchart illustrating an example process 600 performable by or at a wireless communication device that supports sensitive information detection and notification operations. The operations of the process 600 may be implemented by a STA or its components as described herein. For example, the process 600 may be performed by a wireless communication device, such as the wireless communication device 100 described with reference to FIG. 1, operating as or within a wireless STA. In some examples, the process 600 may be performed by a wireless STA such as one of the STAs 704 described with reference to FIG. 7.

In block 610, the wireless communication device, via the sensitive information detection system 200, receives an alert associated with a detection of sensitive information. The alert can correspond to another user linked to the account operating the sensitive information detection system 200 on the device. For instance, the user who receives the alert may be configured as an administrator, with caregiver privileges, such that they receive notifications from other users using the sensitive information detection system 200 to type on their respective devices.

In some implementations, the alert includes the name of the user typing the sensitive information, the time in which the sensitive information was typed, at least a portion of the sensitive information typed, which can also be redacted to ensure privacy, a notification identifier making each notification distinguishable from other notifications, or some combination thereof.

In block 620, the wireless communication device, via the sensitive information detection system 200, generates a user interface (UI) displaying a notification window displaying a list of notifications received by the administrator on the wireless communication device. In some implementations, each notification is selectable to allow for additional details of the notification to be displayed to the user. In some implementations, the notification causes the UI to display response action icons associated with the notification. The response action icons can include corrective actions the administrator can take in response to the notification. For instance, a response action icon can include a notification indicating whether the administrator wishes to grant the user the ability to transmit the sensitive information. Another response action icon may be a notification that the administrator acknowledges notice of the notification. In another example, the response action icon may transmit a message to the user informing them to be careful about transmitting that type of information to another individual.

In block 630, the administrator decides whether to provide a response associated with the notification. The response, as described, can take the form of selecting a response action icon. In some implementations, the administrator simply receives a notification that sensitive information has been shared by a user. In such an example, the UI only displays notifications detailing the sensitive information event detected by another user. If the administrator does not respond, then the process 600 can return to block 620 and continue to display the sensitive information notifications, if any. However, if the administrator chooses to provide a response, the process 600 proceeds to block 640.

In block 640, the sensitive information detection system 200 receives, via the UI, input identifying a selected response action from the response action icons. Once received, in block 650, the sensitive information detection system 650 can implement the selected response action. In some implementations, implementing the selected response action includes transmitting a notice to the corresponding device, preventing transmission of unredacted portions of the sensitive information to another recipient. In this example, this response action prevents the user from transmitting that specific information to another recipient on their specific device.

Example Wireless Communication Network

Figure 7:
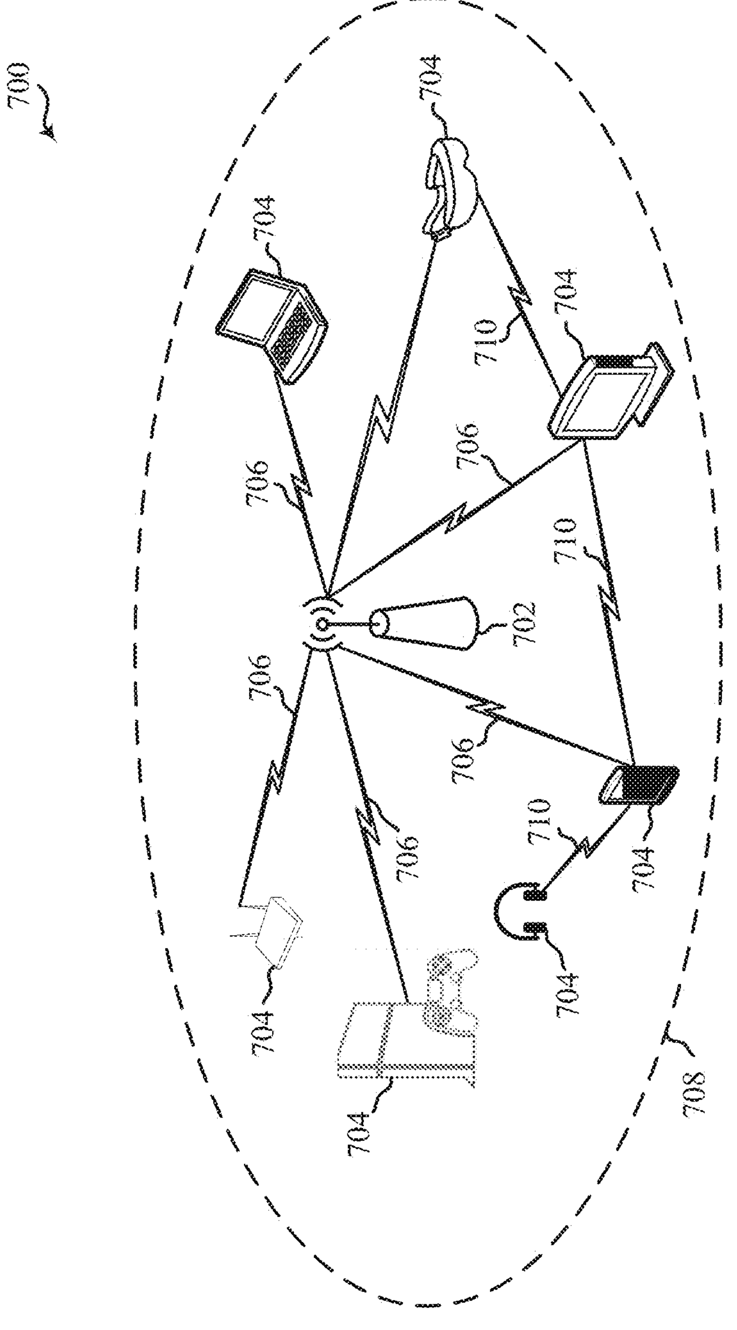
FIG. 7 shows a pictorial diagram of an example wireless communication network.

FIG. 7 shows a pictorial diagram of an example wireless communication network 700. According to some aspects, the wireless communication network 700 can be an example of a wireless local area network (WLAN) such as a Wi-Fi network. For example, the wireless communication network 700 can be a network implementing at least one of the IEEE 802.11 family of wireless communication protocol standards, such as defined by the IEEE 802.11-2020 specification or amendments thereof (including, but not limited to, 802.11ay, 802.11ax (also referred to as Wi-Fi 6), 802.11az, 802.11ba, 802.11bc, 802.11bd, 802.11be (also referred to as Wi-Fi 7), 802.11bf, and 802.11bn (also referred to as Wi-Fi 8)) or other WLAN or Wi-Fi standards, such as that associated with the Integrated Millimeter Wave (IMMW) study group. In some other examples, the wireless communication network 700 can be an example of a cellular radio access network (RAN), such as a 5G or 6G RAN that implements one or more cellular protocols such as those specified in one or more 3GPP standards. In some other examples, the wireless communication network 700 can include a WLAN that functions in an interoperable or converged manner with one or more cellular RANs to provide greater or enhanced network coverage to wireless communication devices within the wireless communication network 700 or to enable such devices to connect to a cellular network's core, such as to access the network management capabilities and functionality offered by the cellular network core. In some other examples, the wireless communication network 700 can include a WLAN that functions in an interoperable or converged manner with one or more personal area networks, such as a network implementing Bluetooth or other wireless technologies, to provide greater or enhanced network coverage or to provide or enable other capabilities, functionality, applications or services.

The wireless communication network 700 may include numerous wireless communication devices, including a wireless access point (AP) 702 and any number of wireless stations (STAs) 704. While only one AP 702 is shown in FIG. 7, the wireless communication network 700 can include multiple APs 702 (for example, in an extended service set (ESS) deployment, enterprise network or AP mesh network), or may not include any AP at all (for example, in an independent basic service set (IBSS) such as a peer-to-peer (P2P) network or other ad hoc network). The AP 702 can be or represent various different types of network entities including, but not limited to, a home networking AP, an enterprise-level AP, a single-frequency AP, a dual-band simultaneous (DBS) AP, a tri-band simultaneous (TBS) AP, a standalone AP, a non-standalone AP, a software-enabled AP (soft AP), and a multi-link AP (also referred to as an AP multi-link device (MLD)), as well as cellular (such as 3GPP, 4G LTE, 5G or 6G) base stations or other cellular network nodes such as a Node B, an evolved Node B (eNB), a gNB, a transmission reception point (TRP) or another type of device or equipment included in a radio access network (RAN), including Open-RAN (O-RAN) network entities, such as a central unit (CU), a distributed unit (DU) or a radio unit (RU).

Each of the STAs 704 also may be referred to as a mobile station (MS), a mobile device, a mobile handset, a wireless handset, an access terminal (AT), a user equipment (UE), a subscriber station (SS), or a subscriber unit, among other examples. The STAs 704 may represent various devices such as mobile phones, other handheld or wearable communication devices, netbooks, notebook computers, tablet computers, laptops, Chromebooks, augmented reality (AR), virtual reality (VR), mixed reality (MR) or extended reality (XR) wireless headsets or other peripheral devices, wireless earbuds, other wearable devices, display devices (for example, TVs, computer monitors or video gaming consoles), video game controllers, navigation systems, music or other audio or stereo devices, remote control devices, printers, kitchen appliances (including smart refrigerators) or other household appliances, key fobs (for example, for passive keyless entry and start (PKES) systems), Internet of Things (IoT) devices, and vehicles, among other examples.

A single AP 702 and an associated set of STAs 704 may be referred to as an infrastructure basic service set (BSS), which is managed by the respective AP 702. FIG. 7 additionally shows an example coverage area 708 of the AP 702, which may represent a basic service area (BSA) of the wireless communication network 700. The BSS may be identified by STAs 704 and other devices by a service set identifier (SSID), as well as a basic service set identifier (BSSID), which may be a medium access control (MAC)

address of the AP 702. The AP 702 may periodically broadcast beacon frames ("beacons"), including the BSSID to enable any STAs 704 within wireless range of the AP 702 to "associate" or re-associate with the AP 702 to establish a respective communication link 706 (hereinafter also referred to as a "Wi-Fi link"), or to maintain a communication link 706, with the AP 702. For example, the beacons can include an identification or indication of a primary channel used by the respective AP 702 as well as a timing synchronization function (TSF) for establishing or maintaining timing synchronization with the AP 702. The AP 702 may provide access to external networks to various STAs 704 in the wireless communication network 700 via respective communication links 706.

To establish a communication link 706 with an AP 702, each of the STAs 704 is configured to perform passive or active scanning operations ("scans") on frequency channels in one or more frequency bands (for example, the 2.4 GHz, 5 GHz, 6 GHz, 45 GHz, or 60 GHz bands). To perform passive scanning, a STA 704 listens for beacons, which are transmitted by respective APs 702 at periodic time intervals referred to as target beacon transmission times (TBTTs). To perform active scanning, a STA 704 generates and sequentially transmits probe requests on each channel to be scanned and listens for probe responses from APs 702. Each STA 704 may identify, determine, ascertain, or select an AP 702 with which to associate in accordance with the scanning information obtained through the passive or active scans, and to perform authentication and association operations to establish a communication link 706 with the selected AP 702. The selected AP 702 assigns an association identifier (AID) to the STA 704 at the culmination of the association operations, which the AP 702 uses to track the STA 704.

In some examples, STAs 704 may form networks without APs 702 or other equipment other than the STAs 704 themselves. One example of such a network is an ad hoc network (or wireless ad hoc network). Ad hoc networks may alternatively be referred to as mesh networks or peer-to-peer (P2P) networks. In some examples, ad hoc networks may be implemented within a larger network such as the wireless communication network 700. In such examples, while the STAs 704 may be capable of communicating with each other through the AP 702 using communication links 706, STAs 704 also can communicate directly with each other via direct wireless communication links 710. Additionally, two STAs 704 may communicate via a direct wireless communication link 710 regardless of whether both STAs 704 are associated with and served by the same AP 702. In such an ad hoc system, one or more of the STAs 704 may assume the role filled by the AP 702 in a BSS. Such a STA 704 may be referred to as a group owner (GO) and may coordinate transmissions within the ad hoc network. Examples of direct wireless communication links 710 include Wi-Fi Direct connections, connections established by using a Wi-Fi Tunneled Direct Link Setup (TDLS) link, and other P2P group connections.

In some wireless communication systems, wireless communication between an AP 702 and an associated STA 704 can be secured. For example, either an AP 702 or a STA 704 may establish a security key for securing wireless communication between itself and the other device and may encrypt the contents of the data and management frames using the security key. In some examples, the control frame and fields within the MAC header of the data or management frames, or both, also may be secured either via encryption or via an integrity check (for example, by generating a message integrity check (MIC) for one or more relevant fields).

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives (SSDs) (e.g., based on RAM), Flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

As used herein, the term "determine" or "determining" encompasses a wide variety of actions and, therefore, "determining" can include calculating, computing, processing, deriving, estimating, investigating, looking up (such as via looking up in a table, a database, or another data structure), inferring, ascertaining, or measuring, among other possibilities. Also, "determining" can include receiving (such as receiving information), accessing (such as accessing data stored in memory) or transmitting (such as transmitting information), among other possibilities. Additionally, "determining" can include resolving, selecting, obtaining, choosing, establishing and other such similar actions.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b. Furthermore, as used herein, a phrase referring to "a" or "an" element refers to one or more of such elements acting individually or collectively to perform the recited function(s). Additionally, a "set" refers to one or more items, and a "subset" refers to less than a whole set, but non-empty.

As used herein, "based on" is intended to be interpreted in the inclusive sense, unless otherwise explicitly indicated. For example, "based on" may be used interchangeably with "based at least in part on," "associated with," "in association with," or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The various illustrative components, logic, logical blocks, modules, circuits, operations, and algorithm processes described in connection with the examples disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

The following embodiments represent exemplary embodiments of concepts contemplated herein. Any one of the following embodiments may be combined in a multiple dependent manner to depend from one or more other clauses. Further, any combination of dependent embodiments (e.g., clauses that explicitly depend from a previous clause) may be combined while staying within the scope of aspects contemplated herein. The following clauses are exemplary in nature and are not limiting.

Clause 1. A method for wireless communication by a wireless communication device, including: generating a user interface (UI) displaying a keyboard and an input field associated with communications on the wireless communication device, receiving, via the UI, input identifying a selected character from the keyboard, detecting sensitive information in a character string within the input field, wherein the character string includes the selected character and characters displayed in the input field, and causing the UI to display an alert associated with the detection of the sensitive information in the character string. Thus, the illustrative embodiment provides technological improvements over conventional techniques by implementing a sensitive information detection system that performs more efficient techniques for monitoring and detecting sensitive information prior to transmission and provide notice that alert the user of the sensitive information in addition to corrective actions.

Clause 2. The method of clause 1, further including: redacting, prior to transmission, a portion of the character string containing the sensitive information, and transmitting a notification to a linked account, wherein the notification includes a notice that the sensitive information is typed on the wireless communication device.

Clause 3. The method of clause 1, or 2, wherein the notification includes the redacted portion of the character string containing the sensitive information.

Clause 4. The method of clause 1-3, further including: preventing transmission of the character string including the sensitive information in the input field, receiving an authorization from the linked account, wherein the authorization grants the transmission of the character string, and transmitting the character string in the input field over a network.

Clause 5. The method of clause 1-4, wherein detecting the sensitive information in the character string includes: comparing the character string with secure information on the wireless communication device, and identifying the character string matches a designated character string in the secure information.

Clause 6. The method of clause 1-5, wherein detecting the sensitive information in the character string includes: comparing a predefined pattern to the character string, wherein the predefined pattern corresponds to a sensitive information type, and identifying the character string matches the predefined pattern corresponding to the sensitive information type.

Clause 7. The method of clause 1-6, further including: displaying, via the UI, a dialog window associated with transmitted communications on the wireless communications device, analyzing the transmitted communications for known message content, detecting the transmitted communications includes at least a portion of the known message content, and causing the UI to display a second alert associated with the detection of the portion of the known message content in the transmitted communications.

Clause 8. The method of clause 1-7, further including: transmitting a notification to a linked account, where the notification includes a notice that the transmitted communications includes the portion of the known message content.

Clause 9. The method of clause 1-8, further including: displaying, via the UI, a dialog window associated with transmitted communications on the wireless communications device, where the transmitted communications include contact information associated with a sender, detecting the contact information is associated with a blacklist unapproved for communications, and causing the UI to display a second alert associated with the detection of the contact information being associated with the blacklist.

Clause 10. The method of clause 1-9, further including: transmitting a notification to a linked account, where the notification includes a notice that the contact information is associated with the blacklist.

Clause 11. The method of clause 1-10, further including: redacting a portion of the character string containing the sensitive information in the input field, transmitting, via a network, the redacted character string to a recipient associated with the communications, and causing the UI to display the redacted character string in a dialog window on the wireless communication device.

Clause 12. The method of clause 1-11, further including: collecting information associated with the communications on the wireless communication device, compiling analytics associated with user usage and based, at least in part, on the communications, and transmitting a notification to a linked account, where the notification includes a notice that the sensitive information is typed on the wireless communication device and the analytics.

Clause 13. A wireless communication device, including: a processing system that includes one or more processors and one or more memories coupled with the one or more processors, the processing system configured to cause the wireless communication device to: generate a user interface (UI) displaying a keyboard and an input field associated with communications on the wireless communication device, receive, via the UI, input identifying a selected character from the keyboard, detect sensitive information in a character string within the input field, where the character string includes the selected character and characters displayed in the input field, and cause the UI to display an alert associated with the detection of the sensitive information in the character string. Thus, the illustrative embodiment provides technological improvements over conventional techniques by implementing a sensitive information detection system that performs more efficient techniques for monitoring and detecting sensitive information prior to transmission and provide notice that alert the user of the sensitive information in addition to corrective actions.

Clause 14. The wireless communication device of clause 13, the processing system further configured to cause the wireless communication device to: redact, prior to transmission, a portion of the character string containing the sensitive information, and transmit a notification to a linked account, wherein the notification includes a notice that the sensitive information is typed on the wireless communication device.

Clause 15. The wireless communication device of clause 13-14, where the notification includes the redacted portion of the character string containing the sensitive information.

Clause 16. The wireless communication device of clause 13-15, the processing system further configured to cause the wireless communication device to: prevent transmission of the character string including the sensitive information in the input field, receive an authorization from the linked account, wherein the authorization grants the transmission of the character string, and transmit the character string in the input field over a network.

Clause 17. The wireless communication device of clause 13-16, where detecting the sensitive information in the character string includes: comparing the character string with secure information on the wireless communication device, and identifying the character string matches a designated character string in the secure information.

Clause 18. The wireless communication device of clause 13-17, where detecting the sensitive information in the character string cause the wireless communication device to: compare a predefined pattern to the character string, wherein the predefined pattern corresponds to a sensitive information type, and identify the character string matches the predefined pattern corresponding to the sensitive information type.

Clause 19. A wireless communication device, including: a processing system that includes one or more processors and one or more memories coupled with the one or more processors, the processing system configured to cause the wireless communication device to: receive, via a network, an alert associated with a detection of sensitive information displayed on a second device, generate a user interface (UI) displaying a notification associated with the alert, wherein the notification includes a redacted portion of the sensitive information, cause the UI to display response action icons associated with the notification, receive, via the UI, input identifying a selected response action from the response action icons, and implement the selected response action.

Clause 20. The wireless communication device of clause 19T, where implementing the selected response action causes the wireless communication device to: transmit a notice to the second device preventing transmission of unredacted portions of the sensitive information to another recipient.

What is claimed is:

1. A method for wireless communication by a wireless communication device, comprising:

generating a user interface (UI) displaying a keyboard and an input field associated with communications on the wireless communication device;

receiving, via the UI, input identifying a selected character from the keyboard;

detecting sensitive information in a character string within the input field, wherein the character string includes the selected character and characters displayed in the input field, wherein detecting the sensitive information comprises comparing the character string with stored secure information stored in a secure safe on the wireless communication device, wherein the stored secure information corresponds to a sensitive information value associated with a user of the wireless communication device and is stored in redacted form comprising a redacted portion and an unredacted portion, and identifying that the character string matches the unredacted portion and a number of characters in the character string matches a number of characters stored in the secure safe for the stored secure information;

causing the UI to display an alert associated with the detection of the sensitive information in the character string;

redacting, prior to transmission, a portion of the character string containing the sensitive information;

transmitting a notification to a linked account, wherein the notification includes a notice that the sensitive information is typed on the wireless communication device;

preventing a transmission of the character string including the sensitive information in the input field;

receiving an authorization from the linked account, wherein the authorization grants the transmission of the character string;

transmitting the character string in the input field over a network;

displaying, via the UI, a dialog window associated with transmitted communications on the wireless communication device, wherein the transmitted communications include contact information associated with a sender;

detecting the contact information is associated with a blacklist unapproved for communications; and causing the UI to display a second alert associated with the detection of the contact information being associated with the blacklist.

2. The method of claim 1, wherein the notification includes the redacted portion of the character string containing the sensitive information.

3. The method of claim 1, wherein detecting the sensitive information in the character string comprises:

comparing the character string with stored secure information on the wireless communication device; and identifying the character string matches at least a portion of the stored secure information.

4. The method of claim 1, wherein detecting the sensitive information in the character string comprises:

comparing a predefined pattern to the character string, wherein the predefined pattern corresponds to a sensitive information type; and identifying the character string matches the predefined pattern corresponding to the sensitive information type.

5. The method of claim 1, further comprising:

displaying, via the UI, a dialog window associated with transmitted communications on the wireless communications device;

analyzing the transmitted communications for known message content;

detecting the transmitted communications includes at least a portion of the known message content; and causing the UI to display a second alert associated with the detection of the portion of the known message content in the transmitted communications.

6. The method of claim 5, further comprising:

transmitting a notification to a linked account, wherein the notification includes a notice that the transmitted communications includes the portion of the known message content.

7. The method of claim 1, further comprising:

transmitting a notification to the linked account, wherein the notification includes a notice that the contact information is associated with the blacklist.

8. The method of claim 1, further comprising:

redacting a portion of the character string containing the sensitive information in the input field;

transmitting, via a network, the redacted character string to a recipient associated with the communications; and causing the UI to display the redacted character string in a dialog window on the wireless communication device.

9. The method of claim 1, further comprising:

collecting information associated with the communications on the wireless communication device;

compiling analytics associated with user usage and based, at least in part, on the communications; and transmitting a notification to a linked account, wherein the notification includes a notice that the sensitive information is typed on the wireless communication device and the analytics.

10. A wireless communication device, comprising:

a processing system that includes one or more processors and one or more memories coupled with the one or more processors, the processing system configured to cause the wireless communication device to:

generate a user interface (UI) displaying a keyboard and an input field associated with communications on the wireless communication device;

receive, via the UI, input identifying a selected character from the keyboard;

detect sensitive information in a character string within the input field, wherein the character string includes the selected character and characters displayed in the input field, wherein detecting the sensitive information comprises comparing the character string with stored secure information stored in a secure safe on the wireless communication device, wherein the stored secure information corresponds to a sensitive information value associated with a user of the wireless communication device and is stored in redacted form comprising a redacted portion and an unredacted portion, and identifying that the character string matches the unredacted portion and a number of characters in the character string matches a number of characters stored in the secure safe for the stored secure information;

cause the UI to display an alert associated with the detection of the sensitive information in the character string;

redact, prior to transmission, a portion of the character string containing the sensitive information;

transmit a notification to a linked account, wherein the notification includes a notice that the sensitive information is typed on the wireless communication device;

display, via the UI, a dialog window associated with transmitted communications on the wireless communication device, wherein the transmitted communications include contact information associated with a sender;

detect the contact information is associated with a blacklist unapproved for communications; and cause the UI to display a second alert associated with the detection of the contact information being associated with the blacklist.

11. The wireless communication device of claim 10, wherein the notification includes the redacted portion of the character string containing the sensitive information.

12. The wireless communication device of claim 10, the processing system further configured to cause the wireless communication device to:

prevent a transmission of the character string including the sensitive information in the input field;

receive an authorization from the linked account, wherein the authorization grants the transmission of the character string; and transmit the character string in the input field over a network.

13. The wireless communication device of claim 10, wherein detecting the sensitive information in the character string comprises:

comparing the character string with secure information on the wireless communication device; and identifying the character string matches a designated character string in the secure information.

14. The wireless communication device of claim 10, wherein detecting the sensitive information in the character string cause the wireless communication device to:

compare a predefined pattern to the character string, wherein the predefined pattern corresponds to a sensitive information type; and identify the character string matches the predefined pattern corresponding to the sensitive information type.

15. A wireless communication device, comprising:

a processing system that includes one or more processors and one or more memories coupled with the one or more processors, the processing system configured to cause the wireless communication device to:

receive, via a network, an alert associated with a detection of sensitive information in a character string within an input field displayed on a second device, wherein detecting the sensitive information comprises comparing the character string with stored secure information stored in a secure safe on the second device, wherein the stored secure information corresponds to a sensitive information value associated with a user of the second device and is stored in redacted form comprising a redacted portion and an unredacted portion, and identifying that the character string matches the unredacted portion and a number of characters in the character string matches a number of characters stored in the secure safe for the stored secure information;

generate a user interface (UI) displaying a notification associated with the alert, wherein the notification includes a redacted portion of the sensitive information;

cause the UI to display response action icons associated with the notification;

receive, via the UI, input identifying a selected response action from the response action icons;

implement the selected response action by transmitting, via the network, an authorization or an instruction to the second device;

receive, via the network, a notification associated with transmitted communications on the second device, wherein the transmitted communications include contact information associated with a sender;

wherein the contact information is detected as being associated with a blacklist unapproved for communications; and cause the UI to display a second alert associated with the detection of the contact information being associated with the blacklist.

16. The wireless communication device of claim 15, wherein implementing the selected response action causes the wireless communication device to:

transmit a notice to the second device preventing transmission of unredacted portions of the sensitive information to another recipient.

* * * * *